(12) United States Patent
Qin

(10) Patent No.: US 10,333,223 B2
(45) Date of Patent: Jun. 25, 2019

(54) FLEXIBLE RFID ANTENNA

(71) Applicant: Johnson Electric International AG, Murten (CH)

(72) Inventor: Ling Qin, Shanghai (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 175 days.

(21) Appl. No.: 14/976,403

(22) Filed: Dec. 21, 2015

(65) Prior Publication Data

US 2016/0190692 A1  Jun. 30, 2016

(30) Foreign Application Priority Data

Dec. 30, 2014  (CN) .......................... 2014 1 0857331

(51) Int. Cl.
  *H01Q 7/00* (2006.01)
  *H01Q 1/38* (2006.01)
  *H01Q 1/22* (2006.01)

(52) U.S. Cl.
  CPC ............. *H01Q 7/00* (2013.01); *H01Q 1/2225* (2013.01); *H01Q 1/38* (2013.01)

(58) Field of Classification Search
  CPC ........... H01Q 7/00; H01Q 1/2225; H01Q 1/38
  USPC ....................................................... 343/870
  See application file for complete search history.

(56) References Cited

U.S. PATENT DOCUMENTS

| | | | | |
|---|---|---|---|---|
| 2003/0033713 | A1* | 2/2003 | Hausladen | G06K 19/07749 29/873 |
| 2005/0024290 | A1* | 2/2005 | Aisenbrey | B29C 45/0013 343/873 |
| 2005/0078035 | A1* | 4/2005 | Oberle | H01Q 1/22 343/700 MS |
| 2007/0218762 | A1* | 9/2007 | Liao | H01R 13/6456 439/607.01 |
| 2010/0289716 | A1* | 11/2010 | Lenzi | H01Q 1/22 343/793 |
| 2012/0081257 | A1* | 4/2012 | Yosui | H01Q 1/2225 343/788 |
| 2012/0153029 | A1* | 6/2012 | Kato | G06K 19/07749 235/492 |
| 2014/0184461 | A1* | 7/2014 | Kim | H01Q 7/06 343/788 |
| 2014/0204539 | A1* | 7/2014 | Loomis | G06F 1/183 361/731 |

(Continued)

FOREIGN PATENT DOCUMENTS

| | | | |
|---|---|---|---|
| JP | 2013161825 | * | 8/2013 |
| WO | WO 2014/000828 A1 | | 1/2014 |
| WO | WO2014000828 | * | 1/2014 |

*Primary Examiner* — Jessica Han
*Assistant Examiner* — Awat M Salih
(74) *Attorney, Agent, or Firm* — Muncy, Geissler, Olds & Lowe, P.C.

(57) ABSTRACT

An RFID antenna for a POS device has a slender, single-sided, flexible substrate with a first end and a second end. Multiple conductors extend along the substrate, from the first end to the second end. A flexible covering layer is attached to the substrate and covers the conductors. The substrate is wrapped to superimposed the ends of the substrate. A connector connects the ends of the conductors on the first end of the substrate to the ends of the conductors on the second end of the substrate whereby the plurality of conductors form an antenna in the form of a continuous helical coil.

20 Claims, 5 Drawing Sheets

(56) References Cited

U.S. PATENT DOCUMENTS

| | | | | |
|---|---|---|---|---|
| 2014/0218261 A1* | 8/2014 | Ito | ............................ | H01Q 7/06 343/866 |
| 2014/0320354 A1* | 10/2014 | Sugita | .............. | G06K 19/07749 343/702 |
| 2014/0347249 A1* | 11/2014 | Bourilkov | ................ | H01Q 1/38 343/904 |
| 2015/0138030 A1* | 5/2015 | Yosui | ....................... | H01Q 1/38 343/787 |

\* cited by examiner

FLEXIBLE RFID ANTENNA

CROSS REFERENCE TO RELATED APPLICATIONS

This non-provisional patent application claims priority under 35 U.S.C. § 119(a) from Patent Application No. 201410857331.7 filed in The People's Republic of China on Dec. 30, 2014, the entire contents of which are hereby incorporated by reference.

FIELD OF THE INVENTION

This invention relates to a Point of Sale (POS) device and in particular, to a radio frequency identification device (RFID) for a POS device.

BACKGROUND OF THE INVENTION

With the development of communication industries, RFID technology has been widely applied in more and more fields. Radio frequency identification technology is a wireless communication technology with which a specific object may be identified and related data may be read and written based on a radio signal, without establishing a mechanical contact or an optical contact between an identification system and the specific object.

The RFID technology is applied in many industries. For example, a tag is attached onto a car being produced, and the factory party may track the progress of the car on the production line. The position of a drug may be tracked in a warehouse. A radio frequency tag may be attached to livestock and pets, allowing the livestock and pets to be positively identified ("positively identified" means to avoid that several animals use the same identify). An identification card based on RFID technology may allow an employee to enter a locked building, and a radio frequency transponder in a car may be used for paying fees related to toll road and parking, for example.

For portable electronic devices, such as a point-of-sales (POS) device, sometimes it is necessary to cover a safety protection device with resin or package the safety protection device, which results in the structure of the safety protection device being heavier and thicker. Therefore, an RFID antenna is widely used in the field of POS devices, to increase an internal space to accommodate more components, thereby making the POS device smaller and lighter.

FIG. 1 shows a manufacturing process of an RFID antenna using conventional technology. The base material 1 is a flexible base material of 250 mm×320 mm, from which eight RFID antenna substrates 2 are cut. A helical coil of a conductor forming a layer on the antenna substrate 2 is formed by means of printing or etching to form a helical antenna. The conductors may be copper traces or other conductive traces. Ends of the conductor occur at an inner periphery and at an outer periphery. Since the end at the inner periphery of the antenna needs to be led to the outer periphery so that the two ends are connected together to other ports, through holes are arranged on the substrate to connect conductively the inner periphery to the outer periphery. Hence, the flexible base material must be a double-sided base material, that is, conductive lines may be arranged on both sides of the base material, which increases the cost and complicates the production process. In addition, this manner of making the antenna is not an efficient use of the material due to the high percentage of discarded material. This further increases the cost of the POS device.

SUMMARY OF THE INVENTION

Hence, there is a desire for an antenna having a higher utilization of materials.

Accordingly, in one aspect thereof, the present invention provides a flexible RFID antenna, comprising: a single-sided flexible substrate having a first end and a second end; a plurality of conductors arranged on the substrate, wherein the plurality of conductors are insulated from each other and extend between the first end and the second end of the substrate; and a flexible covering layer attached to the substrate with the conductors sandwiched between the substrate and the covering layer, wherein ends of the conductors at the first end of the substrate are electrically connected to ends of the conductors at the second end of the substrate, respectively, to form a helical RFID coil.

Preferably, the substrate and the covering layer are of an elongated slender shape.

Preferably, the substrate comprises a first insulating layer which is a polyester (PET) film or a polyimide (PI) film, with a thickness between 12 μm and 125 μm.

Preferably, the substrate further comprises a first adhesive layer which attaches the plurality of conductors onto the substrate.

Preferably, the covering layer comprises a second insulating layer which is a polyester (PET) film, a polyimide (PI) film or an insulating ink layer, with a thickness between 12 μm and 50 μm.

Preferably, the covering layer further comprises a second adhesive layer which attaches the second insulating layer onto the substrate.

Preferably, the covering layer comprises an insulating ink layer.

Preferably, the substrate of the antenna is provided with a plurality of fixing parts for fixing the antenna.

According to a second aspect, the present invention provides a POS device, comprising: a main body; a circuit board on the main body; and an RFID antenna disposed around the main body, wherein the RFID antenna comprises: a single-sided flexible substrate comprising a first end and a second end; a plurality of conductors arranged on the substrate, wherein the plurality of conductors are insulated from each other and extend from the first end to the second end of the substrate; a flexible covering layer attached to the substrate and covering the conductors; and a connector arranged on the main body, the connector being connected to ends of the conductors on the first end of the substrate and ends of the conductors on the second end of the substrate, such that the plurality of conductors form a helical coil, and the antenna is connected to the circuit board by the connector.

Preferably, the substrate and the covering layer are slender in shape.

Preferably, the antenna is provided with at least one fixing part for fixing the antenna to the main body at locations away from the first end and the second end.

Preferably, the antenna is attached to the main body by adhesive.

According to a third aspect, the present invention provides an electronic apparatus comprising a main body, a circuit board and a printed antenna, wherein the printed antenna comprises: a single-sided flexible substrate comprising a first end and a second end; a plurality of parallel conductors arranged on the substrate, wherein the plurality of parallel conductors extend from the first end to the second end of the substrate; a flexible covering layer attached to the substrate, the conductors being sandwiched between the substrate and the covering layer; and a connector arranged on the main body, wherein the connector connects ends of the conductors on the first end of the substrate to ends of the conductors on the second end of the substrate, whereby the conductors form a helical coil, and the antenna is connected to the circuit board via the connector, and the antenna is disposed around the main body.

Using such an antenna, production efficiency is high, and as a circuit is needed to be printed on only one side of the antenna substrate, the production process is simplified and the cost is significantly reduced.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
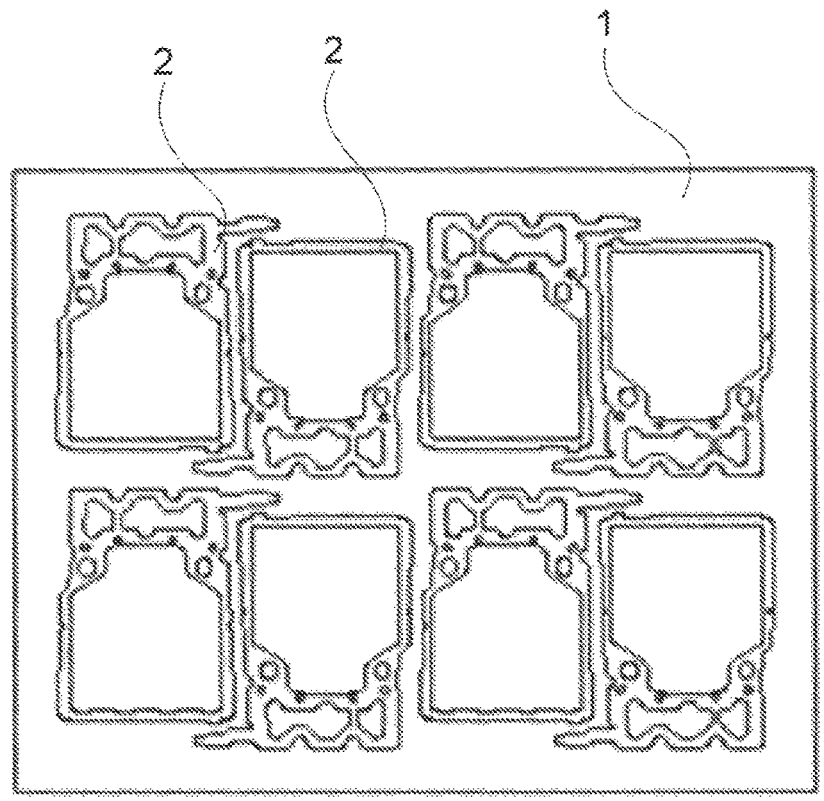
FIG. 1 illustrates a prior art RFID antenna base material.
Figure 2:
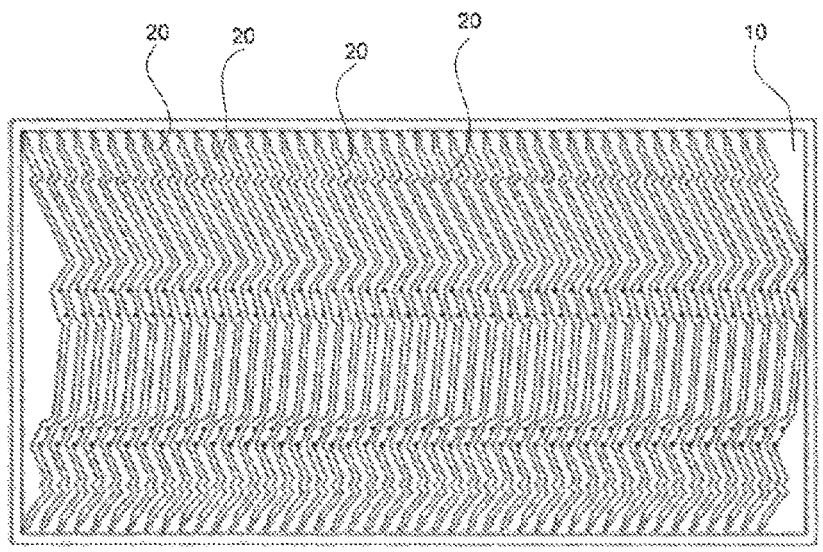
FIG. 2 illustrates an RFID antenna base material according to one embodiment of the present invention.

FIG. 2 illustrates an exemplary structure of an RFID antenna base material according to the preferred embodiment of the present invention. In this embodiment, the entire base material 10 is a rectangular, single-sided, flexible base material, that is, a circuit may be printed or etched on only one side of the base material 10. The antennas 20 are designed to be of a slender shape, such as an essentially elongated rectangular shape, and are arranged in sequence on the surface of the base material 10 on which a circuit may be printed or etched. Individual antennas 20 are cut from the base material 10. Multiple parallel conductors 224 are arranged on each of the antennas 20 by means of printing or etching (see FIG. 5). Through such process, 44 antennas may be formed on a base material 10 of 609 mm×320 mm, compared with only 8 antennas using the prior art method. Thus, the production efficiency is greatly improved by better material utilization.

Conductor traces 224 are typically made of a copper material, but may be made of aluminum, silver, carbon, a mixture of silver and carbon, a transparent conductive polymer, or other conductive ink. Each of the above materials has specific characteristics suitable for the operation and function of the RFID antenna. The material of the conductor traces 224 is selected depending on the function of the RFID antenna.

Figure 3:
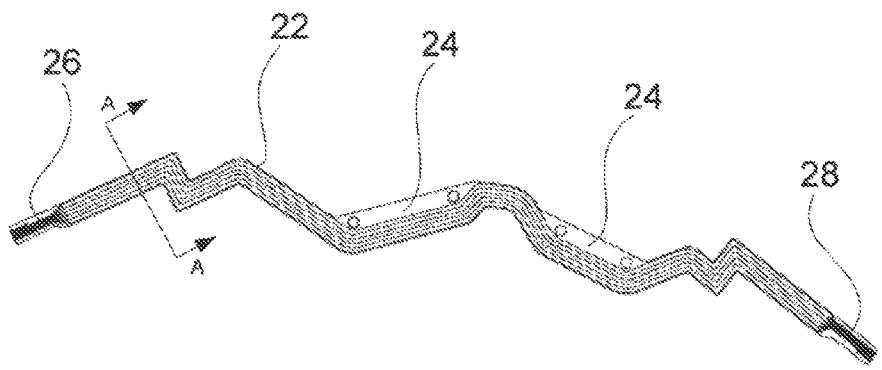
FIG. 3 is a view from above of one of the antennas shown in FIG. 2.

FIG. 3 illustrates an exemplary single antenna cut from the base material of FIG. 2. The antenna 20 includes a slender body 22 provided with two ends 26 and 28. A covering layer 228 is provided on the substrate and covering the conductors, (see FIG. 4). The covering layer 228 is removed from the ends 26 and 28 to expose the conductors to allow connection to a connector 30 (see FIG. 6). The antenna body 22 is provided with two fixing parts 24 at locations away from the two ends. Each of the fixing parts 24 is provided with two fixing holes, for fixing the antenna to the electronic apparatus. It can be appreciated by those skilled in the art, that the antenna body may be attached to the electronic apparatus by adhesive, thus not requiring any fixing parts.

Figure 4:
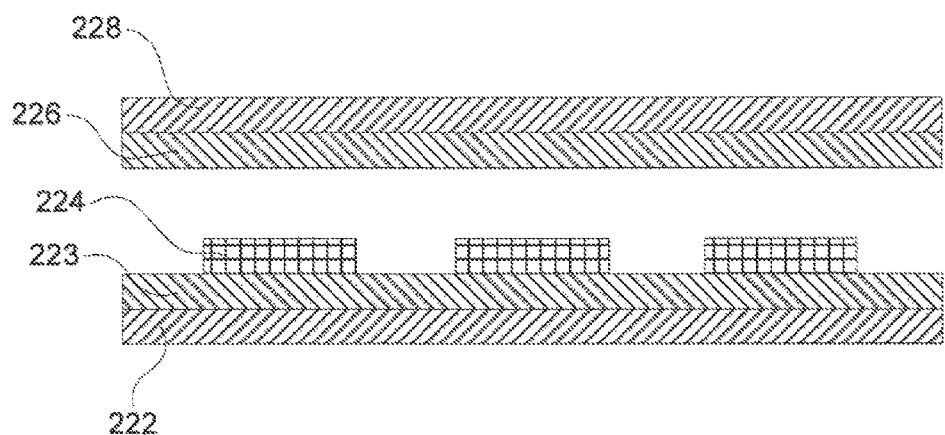
FIG. 4 is a schematic cross-sectional view along A-A of the antenna of FIG. 3.

FIG. 4 is a schematic, cross-sectional view along A-A of the antenna of FIG. 3. In one embodiment, the antenna includes a single-sided insulating substrate 222, an adhesive layer 223, a plurality of parallel conductors 224 formed by conductive traces, an adhesive layer 226 and an insulating covering layer 228. Both the adhesive layer 223 and the adhesive layer 226 are made of insulating materials. In the production process, the conductors 224 are firstly arranged on the substrate 222 including the adhesive layer 223 by means of printing or etching, then the covering layer 228 including the adhesive layer 226 is attached onto the substrate, and thus the parallel conductors 224 are sandwiched between the substrate 222 and the covering layer 228. The multiple parallel conductors 224 are electrically insulated from each other.

In an alternative embodiment, the adhesive layer 223 may be omitted with the conductors 224 being fixed directly on the substrate 222, such as by printing traces using a conductive ink.

In an alternative embodiment, the covering layer 228 and the adhesive layer 226 may be replaced by a single layer of insulation ink, thereby further reducing the thickness of the antenna.

In one embodiment, the substrate 222 is a polymer film, preferably a polyethylene terephthalate (PET, commonly known as Dacron) film. Alternatively, the substrate 222 is a flexible film with a thickness between 12 μm and 125 μm. As a matter of course, the substrate 222 may be thicker as needs dictate. It can be appreciated that the substrate 222 may be other variations of polymer film, including but not limited to polycarbonate, polyethylene napthalate (PEN), polyimide, and polyvinyl chloride (PVC). The substrate 222 may be transparent or opaque and colored, for example, black or white.

The adhesive layers 223 and 226 are preferably heat-sensitive adhesive layers. The adhesive layer 223 is configured to attach the conductors 224 to the substrate 222. Alternatively, the adhesive may also be a liquid adhesive such as epoxy resin, or moisture cured polyurethane. The liquid adhesive is firstly placed or printed between the single-sided substrate 222 and the conductors 224, then the liquid adhesive is cured by wet energy, thermal energy, or ultraviolet light energy, and thus a permanent bond is formed between the single-sided substrate 222 and the conductors 224. Although these types of adhesives are not pressure sensitive, they can work according to the same principle. Depending on the material of the substrate 222, different pressure-sensitive adhesives having particular adhesive properties may be used, for example, a customized pressure-sensitive adhesive specially developed for particular adhesive requirements.

Figure 5A:
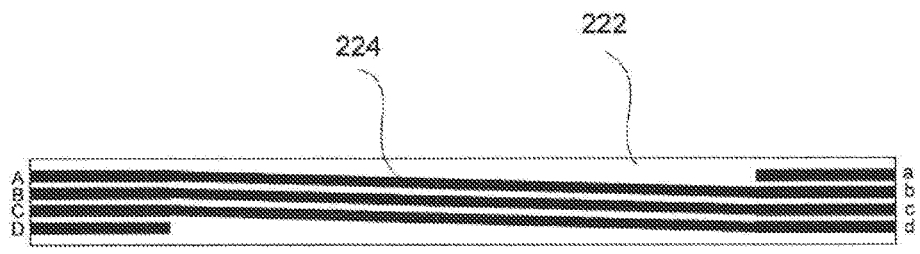
FIGS. 5a, 5b and 5c are schematic diagrams of connection of an RFID antenna according to one embodiment of the present invention, wherein the covering layer of the antenna body has been omitted.
Figure 5B:
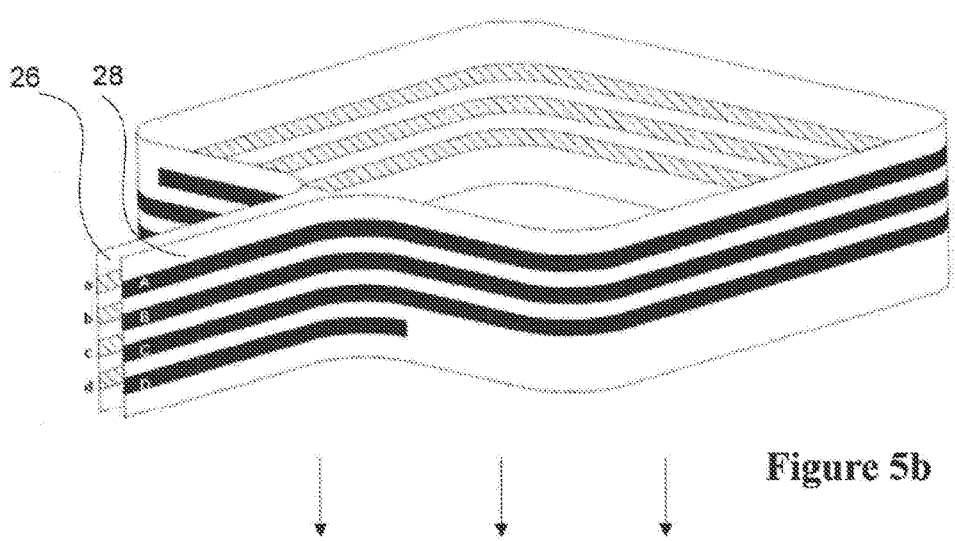
Figure 5C:
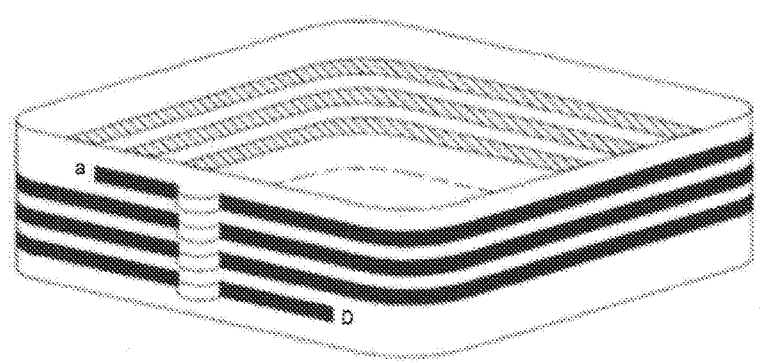

FIGS. 5a to 5c are schematic diagrams of an RFID antenna according to one embodiment of the present invention, where the covering layer 228 of the antenna body has been omitted for clarity of description. The conductors 224 are arranged on the slender substrate in a parallel manner. One end of the substrate 222, has conductor ends "A", "B", "C" and "D" of the conductors and the other end has conductor ends "a", "b", "c" and "d" of the conductors. The antenna body 22 is curled spatially, that is, the antenna body 22 is wrapped around the electronic apparatus (not shown in the Figures). The ends "A", "B", "C" and "D" of the conductors correspond to the other ends "a", "b", "c" and "d" of the conductors as the ends of the substrate are brought together and connected to a double-sided connector 30 (see FIG. 6). Thus, the conductors form a complete helical coil as the connector joins together the respective ends of the conductors. A pin of the connector corresponding to the end "a" and a pin of the connector corresponding to the end "D", as ends of the antenna, are connected to the electronic apparatus, thereby eliminating the need to use a double-sided substrate with bridging of the conductors by means of through holes.

Figure 6:
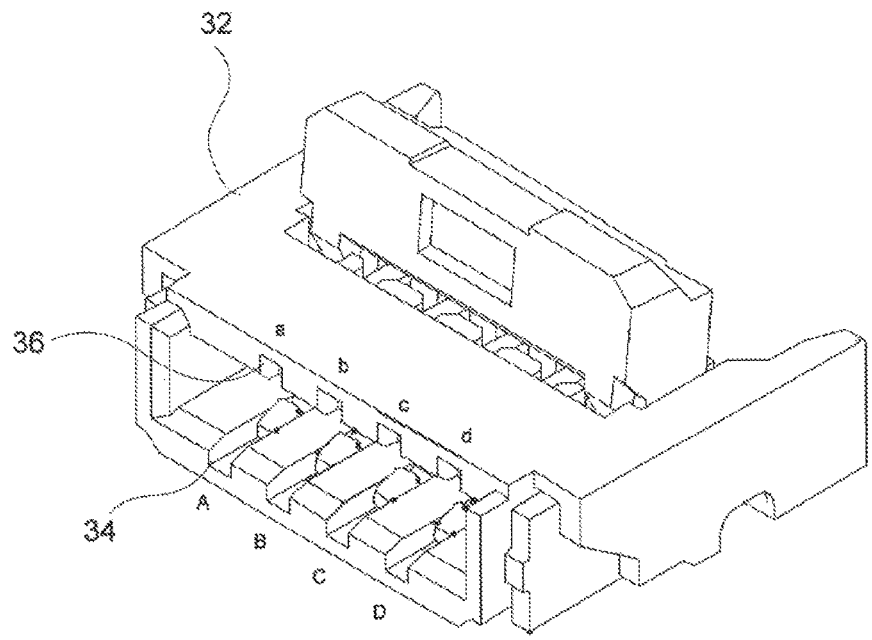
FIG. 6 is a perspective view of a connector for the RFID antenna of FIG. 5.
Figure 7:
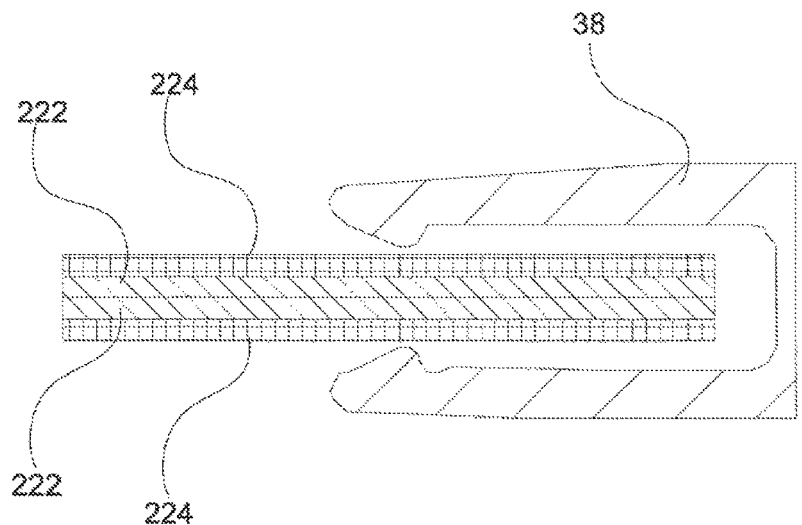
FIG. 7 is a sectional view, on an enlarged scale, of a part of the connector of FIG. 6, connected to the antenna.

FIG. 6 and FIG. 7 show a specific connection application between the RFID antenna and the connector 30. FIG. 6 illustrates the preferred double-sided connector 30, which has advantages of simple structure, convenient batch manufacturing and low cost for manufacturing. The connector 30 includes a connector body 32 provided with four upper conductive pins 36 and four lower conductive pins 34. The upper conductive pins 36 are respectively in communication with the lower conductive pins 34 inside the connector 30, that is, the pins "a", "b", "c" and "d" are respectively connected to the pins "A", "B", "C" and "D". During assembly, the ends "a", "b", "c" and "d" of the conductors 224 are respectively connected to the pins "a", "b", "c" and "d" of the connector 30, and the ends "A", "B", "C" and "D" of the conductors 224 are respectively connected to the pins "A", "B", "C" and "D" of the connector 30. Since the upper and lower conductive pins of the connector are connected together, the ends "A", "B", "C" and "D" of the conductors are electrically connected to the other ends "a", "b", "c" and "d" of the conductors, to form the coil shown in FIG. 5. A manufacturer only needs to lead out the pins "a" and "D" of the connector as two terminals of the antenna to be connected to the circuit board of the electronic apparatus. FIG. 7 illustrates the schematic structural of the connection between a pair of pins of the connector 30 and the conductors 224 at corresponding antenna ends. The covering layer 228 and the adhesive layer 226 on the antenna ends are removed to expose the conductors 224. The substrate 222 at the antenna ends 26 is overlapped with the substrate 222 on the antenna ends 28, and they are inserted into a U-shaped metal clip 38 with the arms of the clip forming the pair of pins of the connector 30, so that the ends of two conductors 224 are electrically connected together.

Figure 8:
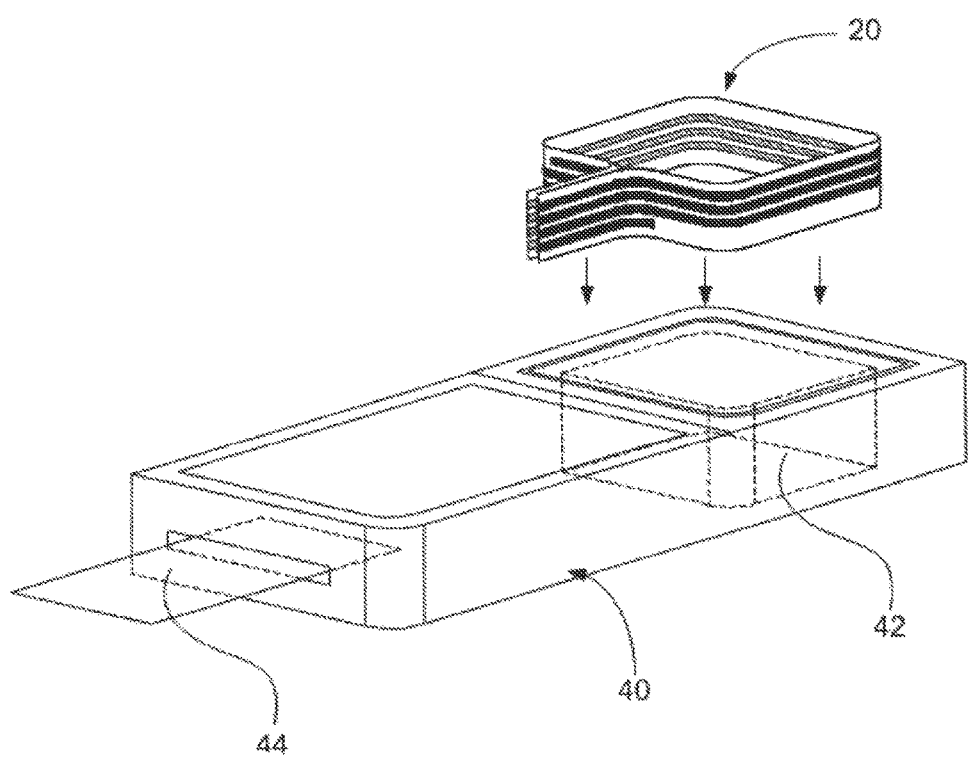
FIG. 8 is a schematic structural view of a POS device using an RFID antenna according to an embodiment of the present invention.

FIG. 8 is a schematic structural view of a POS device using an RFID antenna according to one embodiment of the present invention. The POS device 40 includes a slot into which a credit card 44 may be inserted. The display screen of the POS device is provided with a columnar body 42. The antenna 20 is wrapped around the columnar body 42, and a circuit board (not shown) is arranged inside the POS device, a connector 30 is arranged on the circuit board, the two ends of the antenna are connected to the connector 30 to complete the assembly. When using the POS device, the credit card of a user may be in contact communication with the POS device by the slot, or the credit card may be placed near the antenna 20 and be in non-contact communication with the POS device via the antenna 20.

The present invention provides antennas that are arranged spatially, hence, bridging of coils of the antenna is avoided, thus the production cost is reduced and the production efficiency is improved.

It can be appreciated that the POS device is only a preferred application of the electronic apparatus, and the antenna according to the disclosure may also be used in other electronic apparatuses which need to use a coil antenna.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A flexible RFID antenna, comprising:
   a single-sided flexible substrate having a first end and a second end;
   a plurality of conductors arranged on the substrate, wherein the plurality of conductors are insulated from each other and extend between the first end and the second end of the substrate; and
   a flexible covering layer attached to the substrate with the conductors sandwiched between the substrate and the flexible covering layer;
   a double-sided connector comprising a connector body provided with a plurality of upper conductive pins and a plurality of lower conductive pins; the plurality of upper conductive pins are respectively in communication with ends of the conductors at the first end of the substrate, the plurality of lower conductive pins are respectively in communication with ends of conductors at the second end of the substrate, the plurality of upper conductive pins are respectively directly connected with the plurality of lower conductive pins inside the double-sided connector;
   wherein ends of the conductors at the first end of the substrate and ends of the conductors at the second end of the substrate are inserted into the double-sided connector to form an electrical connection, respectively, to form a helical RFID coil.

2. The antenna of claim 1, wherein the substrate and the covering layer are of an elongated slender shape.

3. The antenna of claim 1, wherein the substrate comprises a first insulating layer which is a polyester (PET) film or a polyimide (PI) film, with a thickness between 12 μm and 125 μm.

4. The antenna of claim 3, wherein the substrate further comprises a first adhesive layer which attaches the plurality of conductors onto the substrate.

5. The antenna of claim 3, wherein the covering layer comprises a second insulating layer which is a polyester (PET) film, a polyimide (PI) film or an insulating ink layer, with a thickness between 12 µm and 50 µm.

6. The antenna of claim 5, wherein the covering layer further comprises a second adhesive layer which attaches the second insulating layer onto the substrate.

7. The antenna of claim 3, wherein the covering layer comprises an insulating ink layer.

8. The antenna of claim 1, wherein the substrate of the antenna is provided with a plurality of fixing parts for fixing the antenna.

9. The antenna of claim 8, wherein each of the fixing parts is provided with two fixing holes for fixing the antenna.

10. The antenna of claim 1, wherein the first end of the substrate is overlapped with the second end of the substrate to be inserted into a U-shaped metal clip of the double-sided connector.

11. The antenna of claim 1, wherein when the first end of the substrate and the second end of the substrate are inserted into the double-sided connector, the flexible covering layer on the first end and the second end are removed to expose the conductors.

12. The antenna of claim 1, wherein the double-sided connector comprises a U-shaped metal, and ends of the conductors at the first end of the substrate and ends of the conductors at the second end of the substrate are inserted into the U-shaped metal with arms of the U-shaped metal forming the plurality of upper and lower conductive pins.

13. A POS device, comprising: a main body; a circuit board on the main body; and an RFID antenna disposed around the main body, wherein the RFID antenna comprises:
a single-sided flexible substrate comprising a first end and a second end;
a plurality of conductors arranged on the substrate, wherein the plurality of conductors are insulated from each other and extend from the first end to the second end of the substrate;
a flexible covering layer attached to the substrate and covering the conductors; and
a double-sided connector arranged on the main body, ends of the conductors on the first end of the substrate and ends of the conductors on the second end of the substrate being inserted to the double-sided connector to form an electrical connection, such that the plurality of conductors form a helical coil, and the antenna is connected to the circuit board by the double-sided connector, wherein the double-sided connector comprises a connector body provided with a plurality of upper conductive pins and a plurality of lower conductive pins; the plurality of upper conductive pins are respectively in communication with ends of the conductors at the first end of the substrate, the plurality of lower conductive pins are respectively in communication with ends of conductors at the second end of the substrate, the plurality of upper conductive pins are respectively directly connected with the plurality of lower conductive pins inside the double-sided connector.

14. The POS device of claim 13, wherein the substrate and the covering layer are slender in shape.

15. The POS device of claim 14, wherein the antenna is provided with at least one fixing part for fixing the antenna to the main body at locations away from the first end and the second end.

16. The POS device of claim 14, wherein the antenna is attached to the main body by an adhesive.

17. The POS device of claim 13, wherein the double-sided connector comprises a connector body provided with a plurality of upper conductive pins and a plurality of lower conductive pins; the plurality of upper conductive pins are respectively in communication with ends of the conductors at the first end of the substrate, the plurality of lower conductive pins are respectively in communication with ends of the conductors at the second end of the substrate.

18. The POS device of claim 13, wherein the first end of the substrate is overlapped with the second end of the substrate to be inserted into a U-shaped metal clip of the double-sided connector.

19. The POS device of claim 13, wherein when the first end of the substrate and the second end of the substrate are inserted into the double-sided connector, the flexible covering layer on the first end and the second end are removed to expose the conductors.

20. An electronic apparatus comprising a main body, a circuit board and a printed antenna,
wherein the printed antenna comprises:
a single-sided flexible substrate comprising a first end and a second end;
a plurality of parallel conductors arranged on the substrate, wherein the plurality of parallel conductors extend from the first end to the second end of the substrate;
a flexible covering layer attached to the substrate, the conductors being sandwiched between the substrate and the covering layer; and
a double-sided connector arranged on the main body and comprising a connector body provided with a plurality of upper conductive pins and a plurality of lower conductive pins; the plurality of upper conductive pins are respectively in communication with ends of the conductors at the first end of the substrate, the plurality of lower conductive pins are respectively in communication with ends of conductors at the second end of the substrate, the plurality of upper conductive pins are respectively directly connected with the plurality of lower conductive pins inside the double-sided connector,
wherein the double-sided connector connects ends of the conductors on the first end of the substrate and ends of the conductors on the second end of the substrate being inserted to the double-sided connector to form an electrical connection, whereby the conductors form a helical coil, and
the antenna is connected to the circuit board via the double-sided connector, and the antenna is disposed around the main body.

* * * * *